US009593669B2

(12) United States Patent
Lindholdt et al.

(10) Patent No.: US 9,593,669 B2
(45) Date of Patent: Mar. 14, 2017

(54) HYDRAULIC TRANSMISSION METHODS AND APPARATUS FOR WIND TURBINES

(75) Inventors: Per Nielsen Lindholdt, Aarhus C (DK); Eik Herbsleb, Odder (DK); Allan Holm Jørgensen, Aalborg Ø (DK); Christian Mark Nielsen, Viby J (DK); Hans Henrik Højsgaard, Viborg (DK); Peter Koldkjær, Aarhus N (DK); Kristian Gregerssen, Aalborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 607 days.

(21) Appl. No.: 13/982,402

(22) PCT Filed: Jan. 30, 2012

(86) PCT No.: PCT/DK2012/050039
§ 371 (c)(1),
(2), (4) Date: Nov. 11, 2013

(87) PCT Pub. No.: WO2012/100783
PCT Pub. Date: Aug. 2, 2012

(65) Prior Publication Data
US 2014/0054893 A1    Feb. 27, 2014

Related U.S. Application Data

(60) Provisional application No. 61/437,669, filed on Jan. 30, 2011.

(51) Int. Cl.
F03D 7/02    (2006.01)
(52) U.S. Cl.
CPC ............ F03D 7/0276 (2013.01); F03D 7/02 (2013.01); F03D 7/026 (2013.01); F03D 15/00 (2016.05);
(Continued)

(58) Field of Classification Search
CPC . Y02E 10/00; Y02E 10/70; F03D 9/02; F03D 11/028; F03D 11/0075;
(Continued)

(56) References Cited

U.S. PATENT DOCUMENTS

| 4,503,673 A | * | 3/1985 | Schachle | F03D 7/04 290/44 |
| 5,145,324 A |   | 9/1992 | Dickes et al. | |

(Continued)

FOREIGN PATENT DOCUMENTS

| GB | WO 2012073278 A1 * | 6/2012 | ............ F03D 9/001 |
| GB | WO 2012073279 A1 * | 6/2012 | ............ F03D 9/003 |

(Continued)

OTHER PUBLICATIONS

International Search Report and Written Opinion, PCT/DK2012/050039, Aug. 3, 2012.

*Primary Examiner* — F. Daniel Lopez
*Assistant Examiner* — Richard Drake
(74) *Attorney, Agent, or Firm* — Patterson + Sheridan, LLP

(57) ABSTRACT

A hydraulic transmission for a wind turbine that includes a rotor, one or more blades mounted to the rotor, a hydraulic pump mechanically connected to the rotor, and a hydraulic motor. The hydraulic pump and the hydraulic motor are connected to one another by a high pressure circuit. The hydraulic pump maybe a variable displacement hydraulic pump and the hydraulic motor may include a variable displacement hydraulic motor. The wind turbine, including the rotor, the blades of the rotor, the hydraulic pump, and the hydraulic motor may be controlled according to different approaches.

20 Claims, 12 Drawing Sheets

(52) U.S. Cl.
CPC ....... *F05B 2260/406* (2013.01); *Y02E 10/722* (2013.01); *Y02E 10/723* (2013.01)

(58) Field of Classification Search
CPC .......... F03D 7/0276; F03D 15/00; F03D 7/02; F03D 7/026; F16H 39/04; F16H 39/06
USPC ................... 60/398, 487, 490; 290/44, 55
See application file for complete search history.

(56) References Cited

U.S. PATENT DOCUMENTS

| | | | | |
|---|---|---|---|---|
| 6,915,631 | B2* | 7/2005 | Kado | F16H 61/438 |
| | | | | 60/394 |
| 7,863,767 | B2* | 1/2011 | Chapple | F03D 7/02 |
| | | | | 126/247 |
| 8,511,079 | B2* | 8/2013 | Stoltz | F03D 9/001 |
| | | | | 60/398 |
| 2007/0216166 | A1* | 9/2007 | Schubert | F03D 7/0224 |
| | | | | 290/55 |
| 2014/0070534 | A1* | 3/2014 | Hamano | F03D 11/026 |
| | | | | 290/43 |

FOREIGN PATENT DOCUMENTS

| | | | | |
|---|---|---|---|---|
| GB | WO 2012073281 A1 * | 6/2012 | ............ | F03B 13/264 |
| WO | 2007/053036 A1 | 5/2007 | | |
| WO | 2009/076757 A2 | 6/2009 | | |

* cited by examiner

HYDRAULIC TRANSMISSION METHODS AND APPARATUS FOR WIND TURBINES

FIELD

The field is that of hydraulic transmissions and more particularly hydrostatic transmissions as may be used in wind turbines and/or tide turbines.

RELATED ART

Hydraulic transmissions have been proposed for wind turbines for some time, although seldom if ever placed in serial production. More recently, trends associated with alternative drivetrains for wind turbines have trended toward direct drive solutions and medium speed solutions. Direct drive solutions lack a transmission altogether, coupling a rotor of a wind turbine directly to a generator. Medium speed solutions utilize a mechanical gearbox, typically include a planetary gear, but proved an output that is slower than a speed normally associated with convention wind turbines. Despite the trend away from hydraulic transmissions and toward alternate systems, the Applicants have appreciated that hydraulic transmissions may provide some benefits that result in a reduction of the cost of energy, particularly relating the various manners in which hydraulic transmissions may allow a wind turbine to be controlled.

SUMMARY

According to one aspect, a method of controlling a wind turbine is disclosed. The wind turbine includes a rotor, one or more blades mounted to the rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor. The variable displacement hydraulic pump is driven with the rotor to provide a pressurized flow of hydraulic fluid to the high pressure circuit. The hydraulic motor is driven with a pressurized flow of hydraulic fluid from the high pressure circuit. A speed of the rotor is controlled by altering displacement of the variable displacement hydraulic pump. A pressure of the high pressure circuit is controlled by altering displacement of the variable displacement hydraulic motor to produce power from the motor that varies with respect the variable displacement of the hydraulic motor.

According to one aspect, a method of controlling a wind turbine is disclosed. The wind turbine includes a rotor, one or more blades mounted to the rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor. The variable displacement hydraulic pump is driven with the rotor to provide a pressurized flow of hydraulic fluid to the high pressure circuit. A speed of the rotor is controlled by altering displacement of the variable displacement hydraulic pump. Power harvested from the wind by the rotor is maximized by controlling a blade pitch angle of the one or more blades. The hydraulic motor is driven with a pressurized flow of hydraulic fluid from the high pressure circuit.

According to one aspect, a method of controlling a wind turbine is disclosed. The wind turbine includes a rotor, one or more blades mounted to the rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the variable displacement hydraulic pump with the rotor to provide a pressurized flow of hydraulic fluid to the high pressure circuit. The hydraulic motor is driven with a pressurized flow of hydraulic fluid from the high pressure circuit. In a first mode of operation, rotor speed is controlled by altering displacement of the variable displacement hydraulic pump. In a second mode of operation, different than the first mode of operation, rotor speed is controlled by altering a pitch angle of the one or more blades.

According to one aspect, a method of controlling a wind turbine is disclosed. The wind turbine includes a rotor, one or more blades mounted to the rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving a variable displacement hydraulic pump with the rotor to provide a pressurized flow of hydraulic fluid to the high pressure circuit. The hydraulic motor is driven with a pressurized flow of hydraulic fluid from the high pressure circuit. In a first mode of operation, a speed of the rotor is controlled by altering displacement of the variable displacement hydraulic pump. In a second mode of operation different than the first mode of operation pressure of the high pressure circuit is controlled by altering displacement of the variable displacement hydraulic pump.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor. The variable displacement hydraulic pump is driven with the rotor to provide a pressurized flow of hydraulic fluid to the high pressure circuit. A speed of the rotor is controlled to a rotor speed set point by altering displacement of the variable displacement hydraulic pump. The hydraulic motor is driven at a substantially constant speed with a pressurized flow of hydraulic fluid from the high pressure circuit. Power produced by the hydraulic motor is allowed to vary.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at least in part with a flow of pressurized hydraulic fluid from the high pressure circuit. Pressure of the high pressure circuit is controlled by altering displacement of the variable displacement hydraulic motor to produce power from the motor that varies with respect the variable displacement of the hydraulic motor.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor and maximizing power harvested from the wind by the rotor by controlling a blade pitch angle of the one or more blades. The hydraulic pump is driven with the rotor to provide a pressurized flow of hydraulic fluid to the high pressure circuit. The variable displacement hydraulic motor is driven at least in part with a flow of pressurized hydraulic fluid from the high pressure circuit. Pressure of the high pressure circuit is controlled by altering displacement of the variable displacement hydraulic motor.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at least in part with a flow of pressurized hydraulic fluid from the high pressure circuit. In a first mode of operation, pressure of the high pressure circuit is controlled by altering displacement of the variable displacement hydraulic motor. In a second mode of operation different than the first mode of operation, pressure of the high pressure circuit is controlled by altering displacement of the variable displacement hydraulic pump.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor. The hydraulic pump is driven with the rotor to provide a pressurized flow of hydraulic fluid to the high pressure circuit. The variable displacement hydraulic motor is driven at least in part with a flow of pressurized hydraulic fluid from the high pressure circuit. Pressure of the high pressure circuit is controlled by altering displacement of the variable displacement hydraulic motor. Power produced by the motor is allowed to vary.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at least in part with a flow of pressurized hydraulic fluid from the high pressure circuit. Pressure of the high pressure circuit is controlled to a common pressure set point for different rotor speeds by altering displacement of the variable displacement hydraulic motor.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at least in part with a flow of pressurized hydraulic fluid from the high pressure circuit. In a first mode of operation, pressure of the high pressure circuit is controlled by altering displacement of the variable displacement hydraulic motor. In a second mode of operation, different than the first mode of operation, pressure of the high pressure circuit is controlled by altering displacement of the variable displacement hydraulic pump.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and controlling a speed of the rotor by altering a pitch angle of blades on the rotor to achieve a substantially constant rotor speed for different wind levels. The variable displacement hydraulic pump is driven with the rotor to provide a pressurized flow of hydraulic fluid to the high pressure circuit. Pressure of the high pressure circuit is controlled to a set pressure level by altering displacement of the variable displacement hydraulic pump. The variable displacement hydraulic motor is controlled with a pressurized flow of hydraulic fluid from the high pressure circuit.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and controlling a speed of the rotor by altering a pitch angle of blades on the rotor to maintain a rotor speed below an upper rotor speed limit. The variable displacement hydraulic pump is driven by the rotor to provide a pressurized flow of hydraulic fluid to the high pressure circuit. Pressure of the high pressure circuit is controlled to a set pressure level by altering displacement of the variable displacement hydraulic pump. The variable displacement hydraulic motor is driven with a pressurized flow of hydraulic fluid from the high pressure circuit.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor and controlling a speed of the rotor by altering a pitch angle of blades on the rotor to achieve a substantially constant rotor speed for different wind levels. The hydraulic pump is driven with the rotor to provide a pressurized flow of hydraulic fluid to the high pressure circuit. The variable displacement hydraulic motor is driven with a pressurized flow of hydraulic fluid from the high pressure circuit. Torque provided by an output shaft of the variable displacement hydraulic motor to a generator is controlled to a torque set point by altering displacement of the variable displacement hydraulic motor.

According to one aspect, a method of controlling a wind turbine is disclosed. The wind turbine includes a rotor, a hydraulic pump mechanically connected to the rotor, a variable displacement hydraulic motor, and a high pressure circuit that connects the hydraulic pump to the hydraulic motor. The method includes harvesting power from wind to rotate the rotor. A speed of the rotor is controlled by altering a pitch angle of blades on the rotor to maintain a rotor speed below an upper rotor speed limit. The hydraulic pump is driven with the rotor to provide a pressurized flow of hydraulic fluid to the high pressure circuit. The variable displacement hydraulic motor is driven with a pressurized flow of hydraulic fluid from the high pressure circuit. Torque provided by an output shaft of the variable displacement hydraulic motor to a generator is controlled to a torque set point by altering displacement of the variable displacement hydraulic motor.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at a substantially constant speed with a pressurized flow of hydraulic fluid from the high pressure circuit. Pressure of the high pressure circuit is controlled to a set pressure level initially by a first mode and then by a second mode. The first mode includes altering displacement of the variable displacement hydraulic pump. The second mode includes altering displacement of the variable displacement hydraulic motor.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven at a substantially constant speed with a pressurized flow of hydraulic fluid from the high pressure circuit. In a first mode of operation, pressure of the high pressure circuit is controlled by altering displacement of the variable displacement hydraulic pump. Then, in a second mode of operation different than the first mode of operation, pressure of the high pressure circuit is controlled by altering displacement of the variable displacement hydraulic motor.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the hydraulic pump with the rotor to provide a pressurized flow of hydraulic fluid to the high pressure circuit. The variable displacement hydraulic motor is driven with a pressurized flow of hydraulic fluid from the high pressure circuit. Energy is stored in a high pressure accumulator that is in fluid communication with the high pressure circuit with a valveless connection.

According to one aspect, a method of controlling a wind turbine is disclosed. The wind turbine includes a rotor, a variable displacement hydraulic pump mechanically connected to the rotor, a hydraulic motor, and a high pressure circuit that connects the hydraulic pump to the hydraulic motor. The method includes harvesting power from wind to rotate the rotor. The hydraulic pump is driven with the rotor to provide a pressurized flow of hydraulic fluid to the high pressure circuit. Energy provided to the high pressure circuit is stored in a high pressure accumulator connected to the high pressure circuit in a valveless manner to provide continuous fluid communication therebetween. Energy stored in the high pressure accumulator is released to drive the variable displacement hydraulic motor after the high pressure accumulator has stored a threshold level of energy.

According to one aspect, a method of controlling a wind turbine is disclosed. The wind turbine includes a rotor, a variable displacement hydraulic pump mechanically connected to the rotor, a hydraulic motor, and a high pressure circuit that connects the hydraulic pump to the hydraulic motor. The method includes harvesting power from wind to rotate the rotor. The hydraulic pump is driven with the rotor to provide a pressurized flow of hydraulic fluid to the high pressure circuit. Energy provided to the high pressure circuit is stored in a high pressure accumulator connected to the high pressure. Later, energy stored in the high pressure accumulator is released to drive the variable displacement hydraulic motor and a generator connected thereto to perform a black start of an electric grid.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor. The hydraulic pump is driven with the rotor to provide a first pressurized flow of hydraulic fluid to the high pressure circuit. The variable displacement hydraulic motor is driven with a second pressurized flow of hydraulic fluid from the high pressure circuit. Displacement of the variable displacement hydraulic pump is increased to draw kinetic energy from the rotor to increase the first pressurized flow of hydraulic fluid to the high pressure circuit. Displacement of the variable displacement hydraulic motor is increased to increase the second pressurized flow of hydraulic fluid.

According to one aspect, a method of controlling a wind turbine is disclosed. The wind turbine includes a rotor, a variable displacement hydraulic pump mechanically connected to the rotor, a variable displacement hydraulic motor, and a high pressure circuit that connects the hydraulic pump to the hydraulic motor. The method includes harvesting power from wind to rotate the rotor and driving the variable displacement hydraulic pump with the rotor to provide a pressurized flow of hydraulic fluid to the high pressure circuit. The variable displacement hydraulic motor is driven with a pressurized flow of hydraulic fluid from the high pressure circuit. A pitch angle of blades of the rotor is controlled with a pitch angle controller. A displacement value of the variable displacement hydraulic pump is controlled with a pump controller. A displacement value of the variable displacement hydraulic motor is controlled with a motor controller. A high pressure circuit pressure level set point is controlled with a turbine controller.

According to one aspect, a method of controlling a wind turbine is disclosed that includes synchronizing a synchronous generator coupled to a variable displacement hydraulic motor of a wind turbine. An operating speed of the hydraulic motor and synchronous generator is controlled by altering a displacement of the variable displacement hydraulic motor to bring the synchronous generator toward a synchronization speed associated with an electric grid. Then the operating speed of the hydraulic motor is controlled by altering a displacement of the variable displacement hydraulic motor to bring the synchronous generator into phase with the electric grid. Then the synchronous generator is synchronized to the electric grid.

BRIEF DESCRIPTION OF THE DRAWINGS

The accompanying drawings are not intended to be drawn to scale. In the drawings, each identical or nearly identical component that is illustrated in various figures may be represented by a like numeral or similar text. For purposes of clarity, not every component may be labelled in every drawing. In the drawings.

DETAILED DESCRIPTION OF THE FIGURES AND VARIOUS EMBODIMENTS

Figure 1:
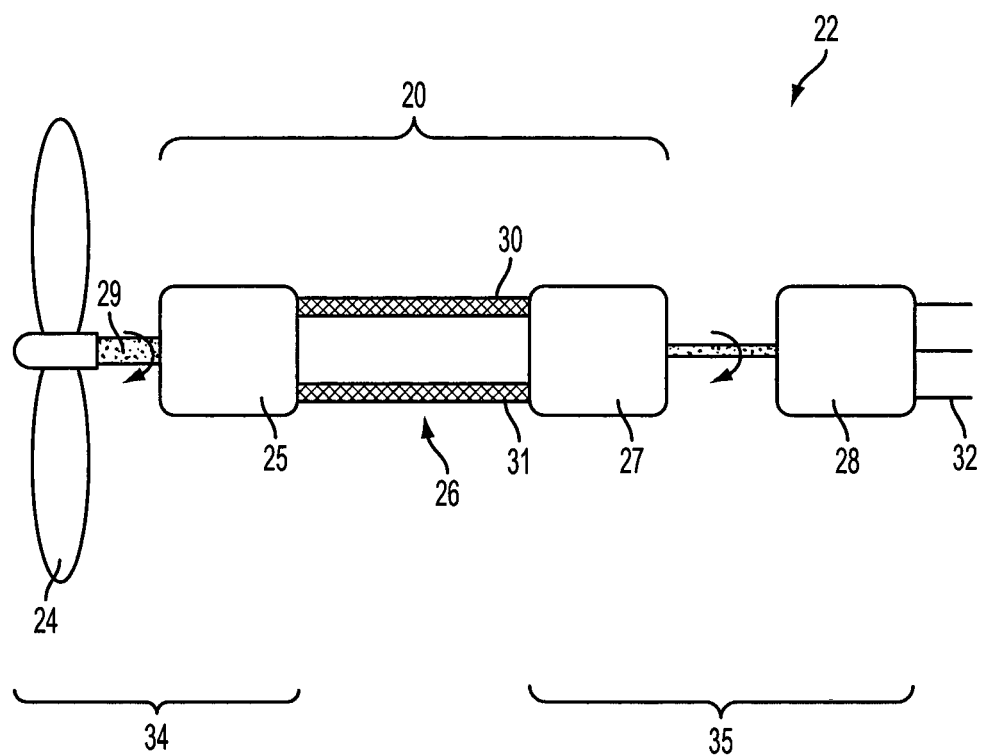
FIG. 1 is a schematic representation of a hydraulic transmission incorporated into a wind turbine that harvests wind power to create electrical power, according to one embodiment.

FIG. 1 shows a schematic view of a hydraulic transmission 20 incorporated into a wind turbine 22, including many of the components of the transmission and drivetrain, according to one embodiment. The primary components include a rotor 24, a hydraulic pump 25, a hydraulic conveyance system 26, a hydraulic motor 27, and a generator 28. The rotor, when driven by the wind, converts wind power into rotational, mechanical power that is provided to the pump through a drive shaft 29. The drive shaft powers the hydraulic pump to produce a pressurized flow of hydraulic fluid to the hydraulic conveyance system. In the embodiment of FIG. 1, the hydraulic conveyance system simply includes a high pressure circuit 30 to deliver a pressurized flow of hydraulic fluid from the hydraulic pump to the hydraulic motor and a low pressure circuit 31 for the return of low pressure hydraulic fluid from the motor to the pump. The motor, driven by the flow of pressurized hydraulic fluid, powers an electrical generator, and/or any other components of an electrical system, which provides electrical power as output 32 from the wind turbine.

The hydraulic pump and the hydraulic motor together may be viewed as a hydraulic transmission capable of receiving an input speed and torque through an input shaft and delivering a different combination output speed and torque at an output shaft, each combination of speed and torque at a substantially common power level. According to some embodiments, the hydraulic pump and/or hydraulic motor may be capable of operating at varying displacements, in effect allowing different combinations of input torque and speed for corresponding combinations of output torque and speed, all at substantially common power levels. The combinations of input torque and speed may vary continuously or step-wise for combinations of output torque and speed, depending on the degree to which the pump and/or motor displacements are capable of varying. The hydraulic pump and rotor may together be viewed as a pump/rotor subsystem 34 and the hydraulic motor/generator as a motor generator subsystem 35, as shown in FIG. 1.

Hydraulic transmissions having varying pump and/or motor displacements may effectively allow the operating parameters of the pump, including input torque and speed, to be decoupled from the output torque and speed. This decoupling may provide flexibility for the system to operate according to partial load and/or full load modes, among others described herein. That is, the operation of the motor, or a subsystem of the motor/generator, can be controlled separately from the operation of the pump, or a subsystem of the pump/rotor.

Figure 2:
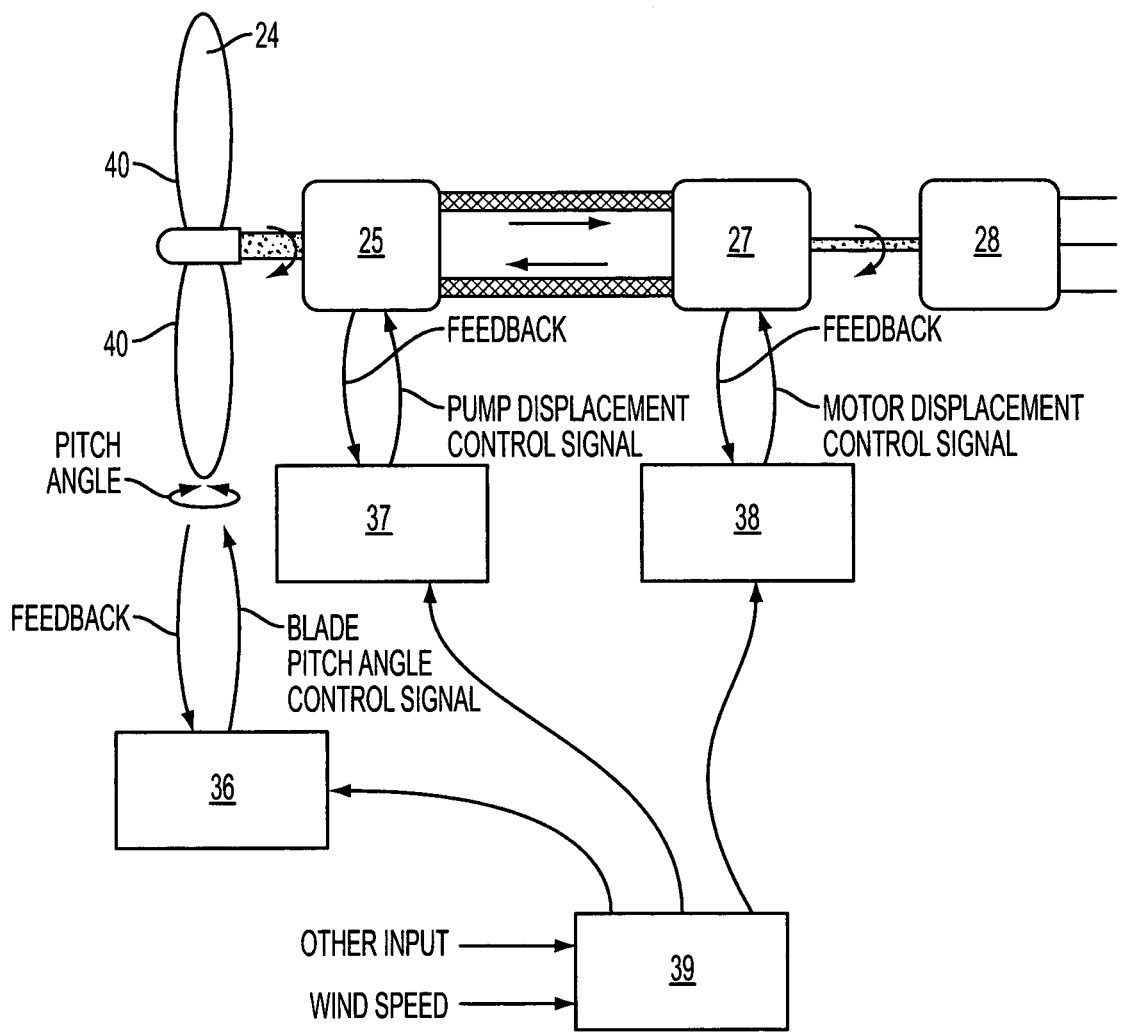
FIG. 2 is a schematic representation of the embodiment of FIG. 1, including representations of information flow and controllers for various components and an overall controller for the wind turbine drive train, according to one embodiment.

FIG. 2 shows a schematic representation of one embodiment, including arrows representing the flow of information between controllers and each of a pitch angle controller 36, a pump controller 37, and a motor controller 38. An overall turbine controller 39 is also represented, including the flow of information to and therefrom. FIG. 2 also reflects how the pump/rotor subsystem may be viewed as decoupled from the motor/generator subsystem by virtue of the separate control schemed associated with each of the pump and the motor, and the fact that similar amounts of power may be transferred between the pump and motor at different combinations of hydraulic fluid pressure and flow rates. It is to be appreciated that although the basic control loops and associated controllers described herein as separate, such as those shown in FIGS. 2, 3a-3c, and 4a-4c, may be implemented as substantially separate algorithms within a common controller.

Figure 3A:
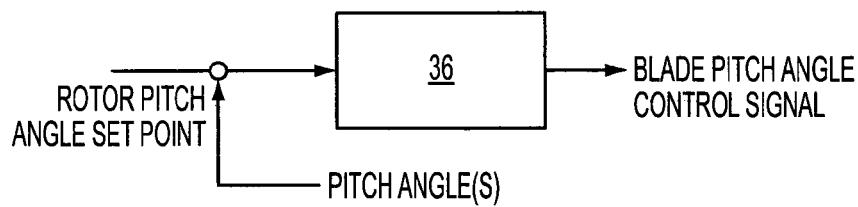
FIG. 3a is a control diagram representing one mode of control for a rotor in a variable power mode of operation, according to one embodiment.
Figure 3B:
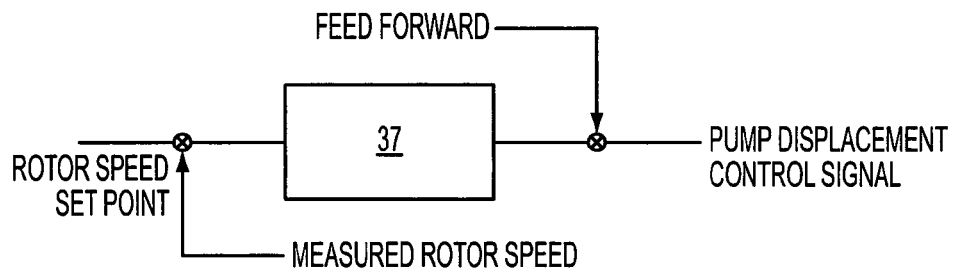
FIG. 3b is a control diagram representing one mode of control for a pump in a variable power mode of operation, according to one embodiment.
Figure 3C:
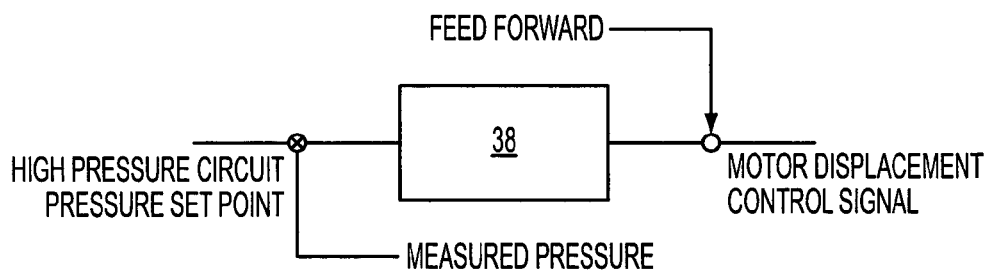
FIG. 3c is a control diagram representing one mode of control for a motor in a variable power mode of operation, according to one embodiment.
Figure 3D:
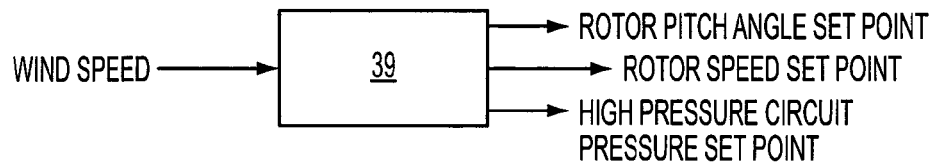
FIG. 3d is a control diagram representing one mode of controlling drive train operation in a variable power mode of operation, according to one embodiment.

FIGS. 3a-3c show control schematics that may be used to provide control to each of the blades of the rotor, the pump, and the motor, respectively, according to a varying power mode of operation. Additionally, FIG. 3d shows a turbine controller that may define set points that each of the controllers of FIGS. 3a-3c is to operate to, based on current wind levels. The turbine may be operated under such a varying power mode to maximize the power that is harvested from the wind that is available, particularly where the available wind is not great enough or consistent enough to sustain continued operation at a desired constant power level. It is to be appreciated the term "varying power mode" refers to a mode of operation where the electrical power produced by the generator is allowed to vary, rather than being controlled to a desired set point. This is in contrast to the term "constant power mode", as used herein, which refers to a mode of operation where the electrical power produced by the generator is being controlled to a desired set point.

The desired pitch angle of the rotor blades may be set by accessing a look up table within the turbine controller to maximize the amount of energy taken from the wind, as represented in the blade control schematic of FIG. 3a and the turbine control schematic of FIG. 3d. According to one embodiment, the wind level may be detected, such as with a wind speed sensor located on the wind turbine, and provided to the blade controller as input used to define the set point for blade pitch angle. The blade controller may then control the blade pitch angle to obtain the set point value (feedback loop not shown). According to some embodiments, pitch angles for blades of the rotor are known, a-priori, that derive a maximum amount of power for corresponding wind levels. Maximizing power harvested from the wind by the rotor often includes setting blade pitch angles to provide a maximum amount of lift from blades of the wind turbine. It is to be appreciated, however, that blade pitch angles may be set to maximize power, even where blade pitch angles are constrained for other considerations, such as to keep thrust loads of the rotor against the drivetrain of a wind turbine below a prescribed maximum value and/or to limit blade tip speed. These optimal rotor pitch angles and corresponding wind levels may be stored in a look-up table that is accessed by the controller to define rotor control set points.

Variables other than wind levels may, additionally or alternatively, be used to control blade pitch angles either under varying power modes or other modes. For instance, according to some approaches, blade pitch angles may also be set based in whole or in part on current power levels being produced by the rotor. One approach to gathering rotor power data includes measurement of the pressure and flow output of the pump. This may be accomplished with a pressure sensor and flow sensor in the pump or high pressure circuit. Flow out may also be calculated from angular rotor speed and displacement settings for pump, according to some embodiments. Blade pitch control schemes are also contemplated that do not rely on look-up tables, including schemes that use proportional, proportional-integral, or proportional-integral-derivative type controllers, among others, to define rotor pitch angles for current wind levels. Control schemes for blade pitch or other aspects of the system may include feedback, feed forward, and/or other features including constraints, such as limits on blade tip velocity, shaft torque, and the like. Different types and combinations of controllers and/or constraints may also be used, as it is to be appreciated that rotor control schemes are not limited to those explicitly described herein.

As represented in FIG. 3b, the speed or, equivalently, the angular velocity of the rotor may be controlled by varying the torque applied to the drive shaft by the hydraulic pump in a varying power mode. This may be accomplished by modulating the displacement of the pump as needed to alter the torque applied to the rotor shaft. As shown in FIG. 3d, the turbine controller may identify an optimal rotor speed set point based on wind speed, among other potential input, from a look-up table. The pump controller then adjusts pump displacement based on any deviation between the rotor speed set point and a measured rotor speed. Pump displacement may be increased to increase torque and reduce rotor speed. Conversely, pump displacement may be decreased to decrease torque, allowing the rotor speed to increase. Other possibilities are, however, also contemplated.

The pump controller may use additional variables when controlling rotor speed. By way of example, the degree to which pump displacement is changed by the controller may vary with the pressure levels of the high pressure circuit. As may be appreciated, the same displacement at a higher pressure may produce a greater torque in the hydraulic pump, meaning that a gain of the controller can be lower at higher pressures to accomplish the same effect. Other variables may also be used by the pump controller, including other factors that may impact gain to help the pump avoid saturation, or variables that may represent system constraints. Some of the variables that may be used as additional input and/or for feed forward in the pump controller include pump speed, pump output pressure, and the like.

Hydraulic fluid pressurized by the pump is passed through the high pressure circuit of the hydraulic conveyance system to the hydraulic motor. In the embodiments of FIGS. 1 and 2, the conveyance system is represented simply by plumbing that conveys the pressurized flow of hydraulic fluid to the hydraulic motor, and then to returns the hydraulic fluid to the pump from the motor. Other embodiments may include additional features, as described in greater detail herein, but for the sake of simplicity, some embodiments of varying power control are described with respect to the systems of FIGS. 1 and 2.

The speed at which the motor and generator rotate together is typically determined by the desired frequency at which electrical power is to be delivered. Very often, the generator and motor may need to rotate at a substantially constant speed, particularly where the electrical system includes a synchronous generator. In such embodiments, motor and/or generator speed may not be available as variables to be altered to impact the level of power that passes through these components. The displacement of the hydraulic motor and/or the pressure level of the high pressure circuit, however, may be varied to alter the operating power level of the motor and generator.

In the varying power mode of FIGS. 3a-3d, the motor may be controlled to maintain pressure in the high pressure circuit, or equivalently the motor inlet pressure, to a desired set pressure, as reflected in FIG. 3c. The pressure set point is determined by the turbine controller of FIG. 3d, based on various factors that may include the current wind speed. Motor displacement may be increased to reduce conveyance system pressure as needed to maintain the desired pressure at the set point and, in turn, to deliver more power through the motor. Conversely, motor displacement may be decreased to affect an increase in conveyance system pressure, resulting in a reduction of power passed through the motor.

Additional variables and/or constraints may be used in control of the motor. Greater hydraulic pressures in the high pressure circuit may allow greater changes in motor torque to be made for similar changes in motor displacement. As a result, controller gain may be decreased for higher pressures, and increased for lower pressures. The controller may also include system constrains in addition to the value for motor/generator rotational speed, as noted above. Variables may also be used in feed forward for control of the motor, including pressure in the high pressure circuit and motor speed, to name a few.

FIG. 3d shows one embodiment of a turbine controller that may be used to define set points for each of the rotor, pump, and motor controllers. The turbine controller may also determine when the drivetrain should operate according to a variable power mode. As illustrated, the output of the turbine is determined by current wind speed, although the drivetrain controller may receive other input variables, including wind forecast and power grid requests or forecasts, to name a few. FIG. 3d also illustrates how operation of the motor/generator is decoupled from the pump/rotor. Power through each of the pump and rotor is controlled independent of the power that is transferred through the motor or generator. The power that passes from the pump to the motor depends on the flow rate and pressure of hydraulic fluid in the high pressure circuit, and the set point for at least one of these two variables in the motor may be set independent of the operating parameters of the pump and rotor, at least throughout various operating ranges. While FIG. 3d shows only set points being provided from the turbine controller to the blade pitch angle controller (referred to equivalently herein as the rotor controller), the pump controller, and the motor controller, it is to be appreciated that other information and/or control signals may also be provided. By way of example, according to some embodiments the turbine controller may also perform gain scheduling for each of the controllers of FIGS. 3a-3c based on current wind conditions, forecast wind conditions, high pressure circuit pressure set levels, or other factors.

Figure 4A:
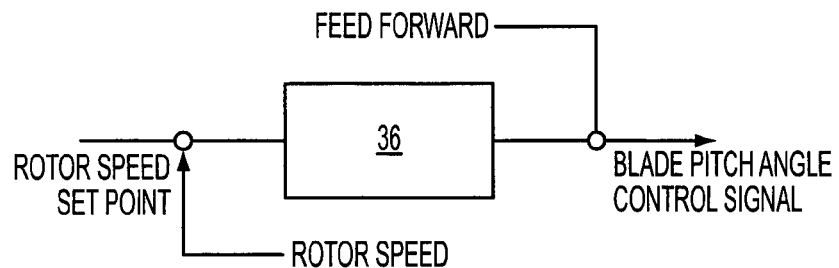
FIG. 4a is a control diagram representing one mode of control for a motor in a constant power mode of operation, according to one embodiment.
Figure 4B:
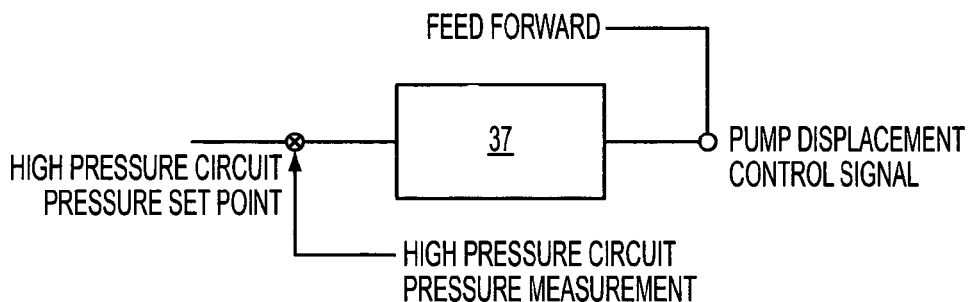
FIG. 4b is a control diagram representing one mode of control for a pump in a constant power mode of operation, according to one embodiment.
Figure 4C:
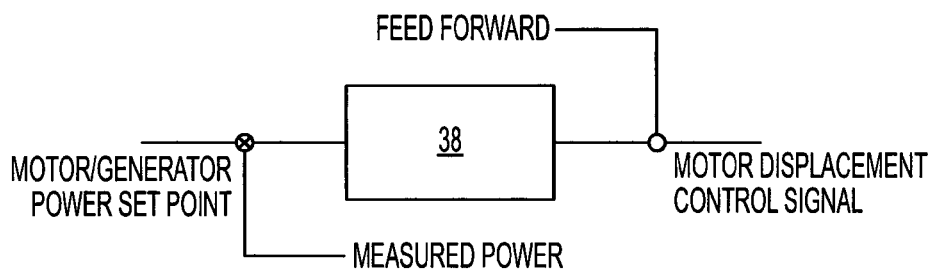
FIG. 4c is a control diagram representing one mode of control for a rotor in a constant power mode of operation, according to one embodiment.

FIGS. 4a-4c show schematics of control schemes for each of the blade pitch, pump, and motor, respectively, during a constant power mode of operation, according to one embodiment. As noted herein, constant power mode refers to a mode where electrical power produced by the generator is controlled to a constant value. The power level of each of the motor and pump may be at similar levels (exclusive of any power lost due to inefficiencies between the pump and motor) in the constant power mode, but this is not a requirement. Constant power mode may be used for control of the wind turbine drivetrain at the rated or maximum power levels of a wind turbine, among other scenarios.

The speed at which the generator operates may be defined by electrical frequency requirements of a power grid or other recipient of wind turbine electrical power output, particularly where the generator is synchronous. The speed of the generator, where a synchronous generator is used, may in fact be controlled by the grid. This may mean that the torque at which the generator operates should be controlled to a substantially constant set point to produce electrical power at a constant level. The generator may have little flexibility when operating in a constant power mode. The hydraulic motor, mechanically connected to the generator either directly or through a gearing having a fixed gear ratio, may operate with different combinations of displacement and pressure at the power level of the generator. This flexibility may allow the motor controller to alter motor displacement to provide the desired power from the conveyance system and through the motor for different hydraulic flow rates and pressure that may be available from the hydraulic conveyance system or as may be set by the drivetrain controller. This is represented in the motor control schematic of FIG. 4c.

Motor displacement may be increased to provide more power, as needed to meet the power requirements of the generator, or decreased to provide less power to meet generator requirements. This is reflected in the control diagram of FIG. 4c, where power measured at the generator or motor is used as feedback to control the motor displacement to achieve to the desired power set point. The flow rate of hydraulic fluid from the conveyance system may additionally be used by the controller to determine the gain used to alter motor displacement. Higher flow rates may allow greater changes in motor torque and thus power as motor displacement is changed, meaning that lower gain values can be used in such circumstances. As is to be understood, lower flow rates may conversely be associated with higher gains in the motor controller. Other variables may additionally or alternatively be used as input to the motor controller when operating in the constant power mode.

Figure 4D:
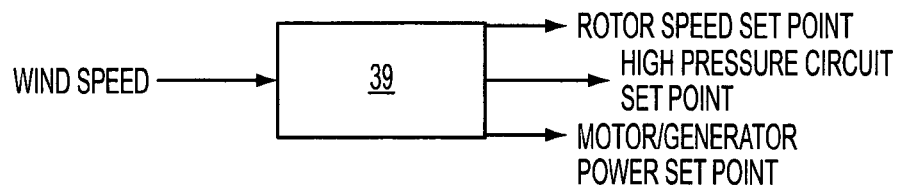
FIG. 4d is a control diagram representing one mode of controlling drive train operation in a constant power mode of operation, according to one embodiment.

The pump, driven by the rotor at a substantially constant speed under the constant power mode, may be controlled to maintain a desired pressure level in the high pressure circuit. A pressure set point for the high pressure circuit may be set by the drivetrain controller, as reflected in FIG. 4d. The pump controller may modulate pump displacement, as reflected in the pump control schematic of FIG. 4b, to obtain the set pressure. As high pressure circuit pressure drops, pump displacement may be increased to provide greater pressurized flow of hydraulic fluid to raise pressure in the high pressure circuit. Pump displacement may also be decreased to reduce the flow of pressurized hydraulic fluid to the hydraulic conveyance system to, in turn, reduce pressure in the high pressure circuit. The gain used by pump controller to alter pump displacement may be changed depending on the flow rate of hydraulic fluid there through or the pressure level in the high pressure circuit.

In the constant power mode of FIGS. 4a-4d, pitch angles of the rotor blades may be controlled to maintain a substantially constant rotor speed. The desired rotor speed under full load operation may be associated with the maximum speed permissible for the wind turbine structure or the site at which the wind turbine is installed or other factors. Operation in this manner, as reflected in FIG. 4d, may be implemented with a look up table that outputs rotor speed set points for corresponding wind speeds. The pitch angle controller of FIG. 4a may then control the pitch angles of the rotor blades in efforts to obtain the desired rotor speed. Other types of control systems may alternatively be used, as is to be appreciated.

Figure 5:
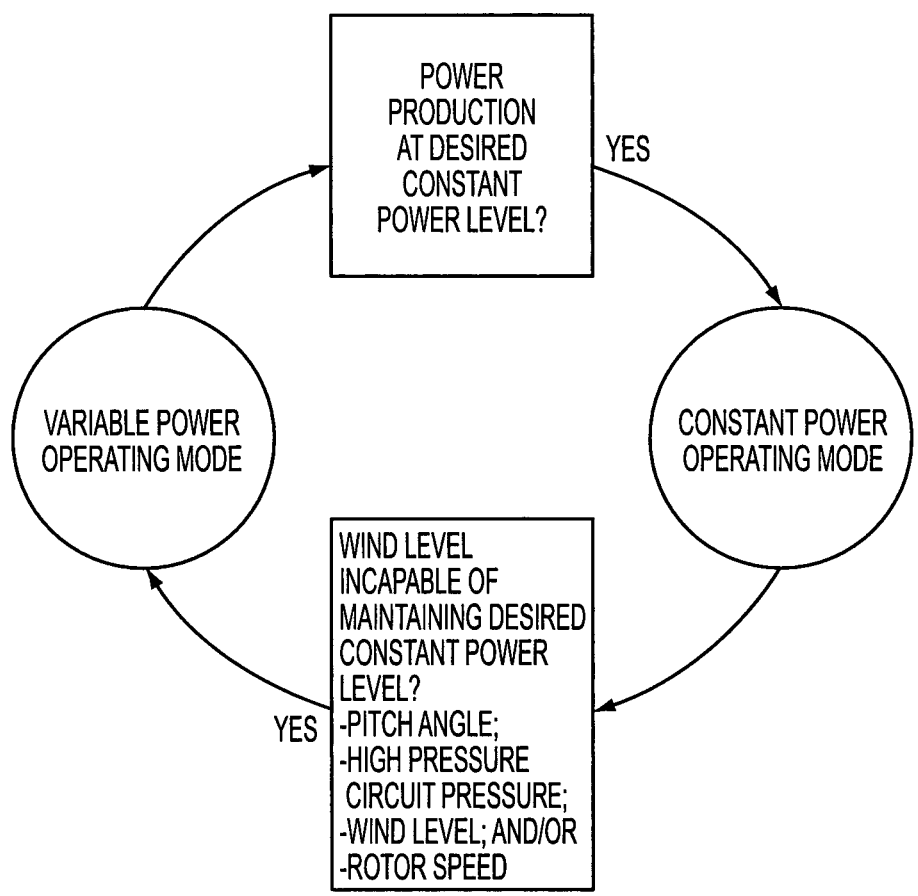
FIG. 5 is a flow diagram for the drivetrain controller of FIGS. 3d and 4d, showing decision points that may be used to switch between varying power modes and constant power modes of operation, according to one embodiment.

One embodiment of logic that may be used by the turbine controller is represented in FIG. 5. The drivetrain may be operated in the constant power mode when the wind level is great enough to sustain operation of the generator at a desired, constant power level. As the wind level falls, however, the pitch angle controller, which is adjusting blade pitch angle of the rotor, may reach the optimum pitch angle, meaning that the rotor is harvesting all of the power that the rotor is capable of taking from the wind and that no further reductions in pitch will have affect. At this point, the rotor may begin to slow as wind levels fall further. The turbine controller may use this point, as indicated either by the current wind level, rotor speed, rotor acceleration, pump power, high pressure circuit pressure level, and/or other similar variables, as a decision point to initiate a change from the constant power mode to the variable power mode of controlling the turbine drivetrain.

As wind falls below levels that can sustain operation of the electric generator at the constant power mode, the rotor will slow, eventually preventing the pump from maintaining the pressure set level in the high pressure circuit, all else constant. In addition or alternative to rotor or wind speed, the drivetrain controller may use a threshold pressure level in the high pressure circuit that is below the set pressure level for constant power mode operation as a decision point to initiate a change from constant power mode to variable power mode, as also show in FIG. 5.

The switch from a variable power mode to a constant power mode may be initiated when the wind is at a level high enough to sustain operation at the constant power level, as is also reflected in FIG. 5. Different variables or measurements may be used, either in isolation or combination, to determine when a change from variable power mode to constant power mode may take place, including but not limited to power level at the generator, power level at the motor, power level at the pump, and wind level, either current or forecasted.

As discussed herein, the desired constant power level may often be associated with the rated or maximum level associated with the electric generator, or other components of the wind turbine. However, other constant power levels are also possible, including levels above the rated power level that are to be sustained for durations of times, as may be requested by the grid. Similarly, the drivetrain may also be operated at constant power levels below the rated level of the wind turbine.

The set pressure level in each of the variable power mode of FIGS. 3a-3d and the constant power mode of FIGS. 4a-4d, or in other embodiments, may be varied to accomplish different beneficial effects. Higher operating pressures may allow more efficient operation of hydraulic pumps, hydraulic motors, hydraulic valves, and/or other hydraulic components due to lower frictional losses associated with lower hydraulic fluid flow. On the other hand, lower operating pressures may be associated with lower component wear rates and/or higher safety factors, in addition to lower frictional losses in pumps and motors. Low pressure operation may also be useful when a potential problem with a wind turbine is suspected, as operating in such a manner may reduce the likelihood of worsening the potential problem. It may also be desirable to set operating pressures at levels that avoid saturation as displacement is altered in the hydraulic pump, hydraulic motor, and/or other components, which may improve controllability of the system. Operating modes may include logic to optimize the pressure set level in the high pressure circuit among these sometimes competing advantages based on the current wind level conditions, forecast wind conditions, and/or other factors.

As may be seen from FIGS. 2, 3a-3d, 4a-4d, and 5, the set pressure for the high pressure circuit is a variable that is free to be set by the turbine controller at any point of operation in either variable power mode or constant power mode, due to the decoupled nature of the system. That is, in each of the variable and constant power modes, the net hydraulic fluid flow rate through the high pressure circuit may be defined by the combination of pump output flow rate and motor input flow rate. One of the pump or motor may be operated to control the high pressure circuit to the set pressure level; however, the decision as to the value of the high pressure circuit set pressure level is not determined by either of the pump or motor, but rather the turbine controller. It is to be appreciated that the physical construction of the pump, motor, high pressure circuit, and other components of the drivetrain may determine upper and lower bounds or restraints on the pressure levels that may be obtained. These constrains may restrict the range for set pressures in the high pressure circuit, while the system and control scheme are still considered decoupled.

A drivetrain may be operated in both modes that are considered decoupled and other modes that are not considered decoupled. By way of example, although the constant power mode of operation described above with respect to the embodiment of FIGS. 4a-4d includes a variable displacement pump, it is to be appreciated that another operating mode may be implemented with a constant displacement pump or simply operated with a variable displacement pump utilizing a constant displacement value. In such a system, the blade pitch control system may be used to maintain a constant rotor torque and speed that result in a constant pressure and flow through the pump, hydraulic conveyance system, and motor. In an alternative embodiment of a constant power mode, pitch angles of the rotor blades may not be able to change quick enough to accommodate variations in the wind level. The pump controller, in these circumstances, may assist or wholly manage control of the rotor by changing the torque applied against the rotor through modulating pump displacement.

Figure 6:
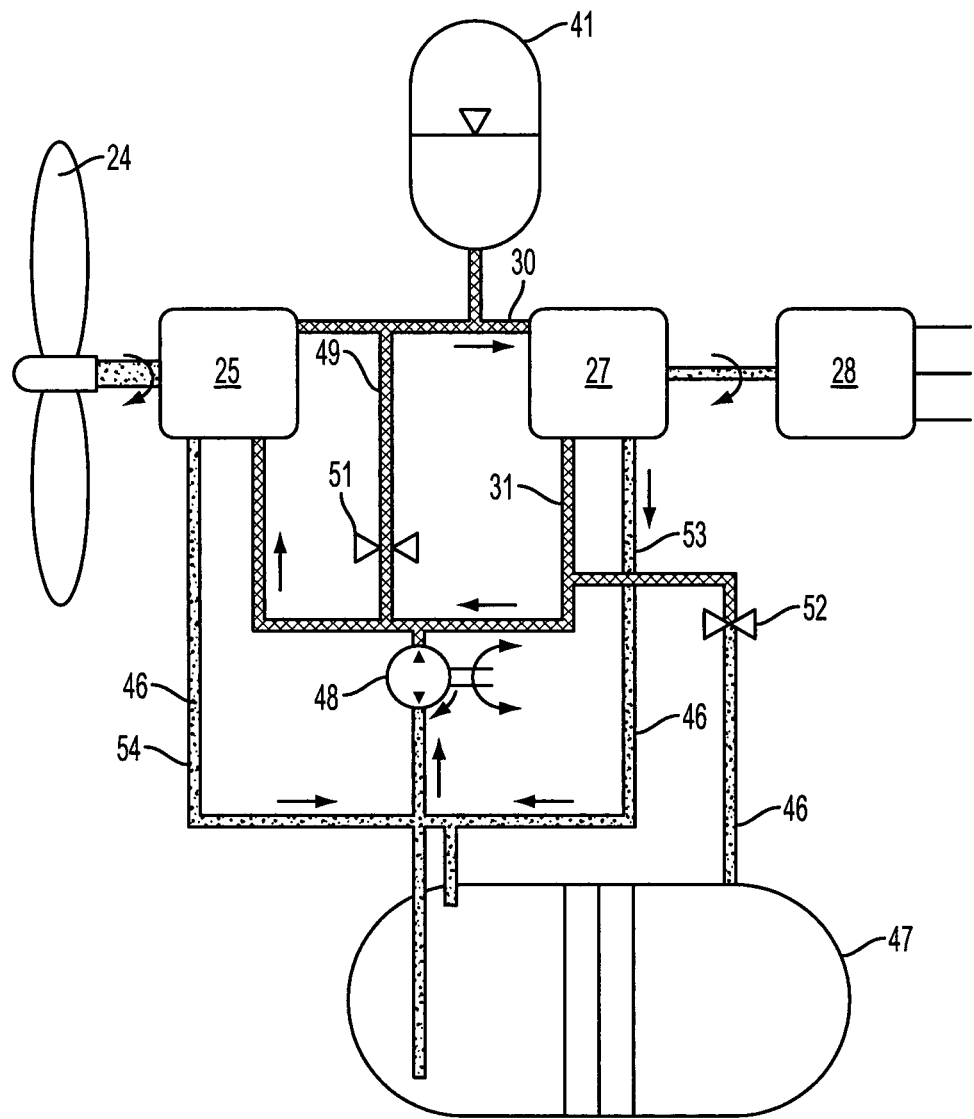
FIG. 6 is a schematic representation of a hydraulic transmission that includes a high pressure accumulator, a high pressure bypass, and a reservoir circuit, incorporated into a wind turbine, according to one embodiment.

FIG. 6 shows a schematic view of an overall system similar to that of FIG. 1, except with the addition of, among other features, a hydraulic conveyance system 26 that includes a high pressure accumulator 41. The accumulator may provide additional capacitance to the conveyance system to help smooth any pressure spikes or variations that otherwise might be present in the pressurized fluid flow between the pump and motor. Additional or improved modes of operation may be possible with the increased capacitance provided by the accumulator in the high pressure circuit, as described herein.

Figure 7:
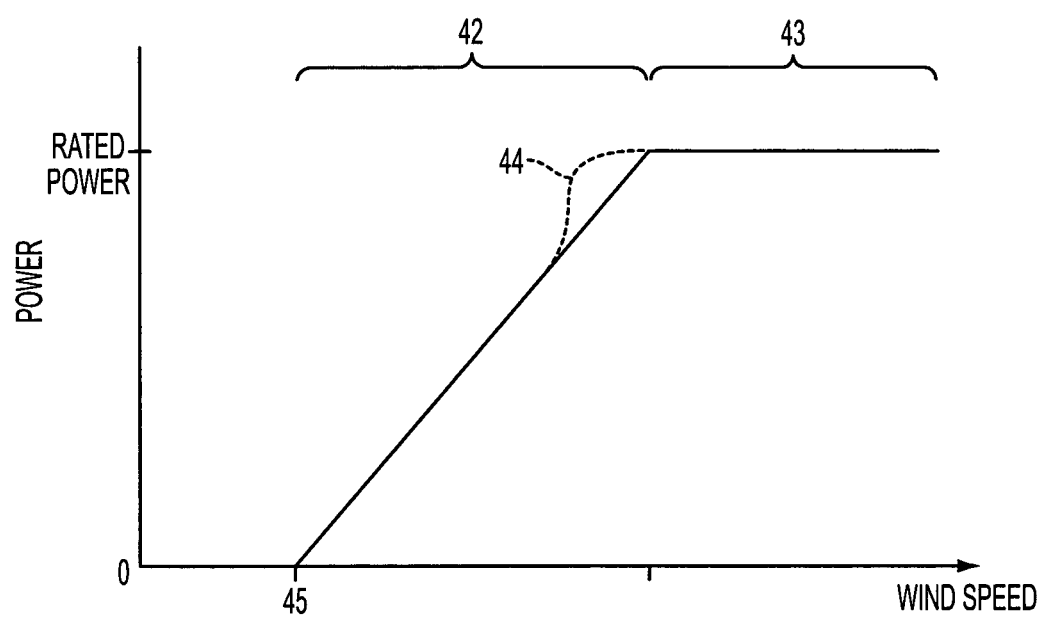
FIG. 7 is a power curve of a wind turbine, showing a hysteresis representative of increased power that may be obtained when switching from a constant power mode to a variable power mode, according to one embodiment.

The power curve of a wind turbine, according to some embodiments, is shown in FIG. 7. The curve includes a variable power region 42, where the drivetrain may be operated in a variable power mode without a controlled set point for the power level of the electric generator. Electrical power provided from the wind turbine generally varies with the wind level through this variable power region. The power curve also includes a constant power region 43, where electrical power provided from the electrical generator is controlled to maintain a substantially constant power level, even where the rotor may be capable of harvesting more power, at least theoretically. The constant power modes of operation discussed herein may be used over the constant power region shown in FIG. 7, which may coincide with the rated power of the turbine, at power levels lower than that shown in FIG. 7, and/or above the rated power level, at least for periods of time.

As mentioned herein, the additional capacitance in the high pressure circuit that is provided by the accumulator 41 may enable additional modes of operation and/or may extend the range over which operating modes may be used. By way of example, in the constant power mode of FIGS. 4a-4d, the rotor may be controlled to allow power to be harvested from the wind at rates greater than is provided from the motor/generator as electrical power (exclusive of inefficiencies of components in the drivetrain). The additional energy from the rotor may be passed through the pump to create additional flow of hydraulic fluid into the high pressure circuit and stored in the accumulator. According to some embodiments, the rotor may be allowed to harvest additional energy from the wind in this manner until the accumulator reaches a threshold capacity, such as 75% full, 90% full, or even 100% full. After the threshold value has been reached, the rotor may be controlled to harvest energy at a rate consistent with power production of the generator.

The energy stored in the accumulator during the constant power mode may be released to improve power production of the wind turbine. According to one embodiment, the energy in the accumulator may be released as the drivetrain transitions from a constant power mode of operation, such as described with respect to FIGS. 4a-4d, to a variable power mode of operation, as described with respect to FIGS. 3a-3d. As the wind falls below levels that can sustain operation of the drivetrain at the constant power level, the rotor may slow, providing less power to the pump, which in turn provides less power to the high pressure circuit. As this occurs, the pressure level in the high pressure circuit may begin to fall below values that are sustained by the pump. At this point, hydraulic fluid flow may be provided by the accumulator to make up for the falling pressure in the high pressure circuit, causing energy release from the accumulator. The energy released from the accumulator may continue powering the motor/generator at the constant power rate. When the stored energy has been released from the accumulator, the pressure level in the high pressure circuit may begin to drop. As discussed with respect to FIG. 5, this drop in pressure may be sensed by the drivetrain controller (in place of or in addition to a reduction in the rotor and/or wind speed) as a decision point for transitioning to a variable power mode of operation.

The hysteresis 44 shown in FIG. 7 at the transition between the constant power region and the variable power regions represents power that has been stored in the accumulator during a constant power mode being released near or during a transition to a variable power operating mode. As is to be appreciated, the additional total area under the power curve associated with the hysteresis that results as power production moves down and to the left along the curve represents an additional amount of power that the wind turbine is capable of producing. Although FIG. 7 shows this transitioning occurring from a rated or maximum, constant power level, it is to be appreciated that the energy stored in the accumulator may be released in different manners, including at other operating points of the wind turbine.

According to other embodiments, energy may be retained in the accumulator as the drivetrain transitions from constant power mode to variable power mode for later release during the variable power mode of operation, such as for a desired power boost or for other purposes. This may be accomplished by transitioning from constant to variable power mode while energy remains in the accumulator, such as by initiating the transition when the wind speed or rotor speed falls below that which can sustain operation at the constant power level. Where such a transition is used, the turbine controller may instruct the motor to maintain a desired set pressure in the high pressure circuit that causes a desired amount of energy to be retained within the accumulator, while allowing the motor/generator to provide less power output to the grid. The blade pitch angle controller and pump controller may also transition to the variable power mode at a common time. The pressure set level of the high pressure circuit may later be reduced during the variable power mode to allow energy to be released from the accumulator and used to power the motor/generator. Alternatively, fluid communication between the accumulator and the high pressure circuit may be selectively controlled by a valve (not shown), operated by the turbine controller.

The accumulator in the high pressure circuit may also be used to increase the amount of power that may be produced by a wind turbine at low wind speeds. According to one embodiment, energy may harvested from the wind and stored in the accumulator when wind levels are at or near the cut-in speed (that is, the speed at which the wind is initially capable of driving the rotor), rather than for immediate use by the motor generator. This process may continue until the accumulator reaches a predetermined level, such as 50% full, 75% full, 90% full, or 100% full, as may be determined by the pressure level in the high pressure circuit. Once the threshold level is reached, the energy may be delivered to the motor/generator for the production of electricity. Operation in this manner may reduce the actual wind speed at which a turbine begins to harvest wind power, as conventional wind turbines are often configured to start harvesting wind power only after the wind levels are capable of driving a rotor for a sustained period to avoid inefficiencies associated with starting and stopping of the wind turbine drivetrain.

The general arrangement of the hydraulic drive described herein also enables power that may present as kinetic energy in the rotor to be released, as may be needed to provide a power boost to an electric grid (or other recipient of power from the wind turbine). According to one approach when the wind turbine is in a variable power mode, the rotor speed set point of the pump controller, as represented by FIG. 3b, may be temporarily decreased to slow the rotor and draw kinetic energy therefrom. The lower rotor speed set point may be reached by increasing the variable displacement of the pump, such that a greater flow of hydraulic fluid is provided to the high pressure circuit as torque against the rotor is increase and the rotor is slowed. The increased flow of hydraulic fluid to the high pressure circuit may then cause an increase in pressure of the high pressure circuit. The increased pressure of the hydraulic circuit, in turn, causes the motor controller to increase motor displacement in efforts to maintain hydraulic pressure in the high pressure circuit at the set pressure level, as show in FIG. 3c. This increased motor displacement provides the desired power boost to the electric grid, or other recipient of power from the wind turbine. It is to be appreciated that a power boost of this nature may be provided in systems that include high pressure accumulators of various types, or that lack high pressure accumulators altogether.

A power boost that takes power may also be implemented that takes kinetic energy from the rotor as need to provide a boost when the wind turbine is operating in a constant power mode, such as that described herein with respect to FIGS. 4a-4d. According to one approach, when a request for a power boost is made, the turbine controller may act to increase hydraulic fluid flow rates through each of the hydraulic pump and motor increasing displacement in each of the pump and motor by substantially similar amounts. All else constant, this will result in an increased torque being applied to the rotor by the pump, slowing the rotor and drawing kinetic energy therefrom. The kinetic energy will be delivered as power through the flow of hydraulic fluid from the pump and to the motor through the high pressure circuit, causing the motor to produce power at an increased rate, which may even occur over rated power for at least a period of time. It is to be appreciated that in embodiments including high pressure accumulators, the net increase in flow through the pump and motor may be different to affect a release or charging of the high pressure accumulators.

Figure 8:
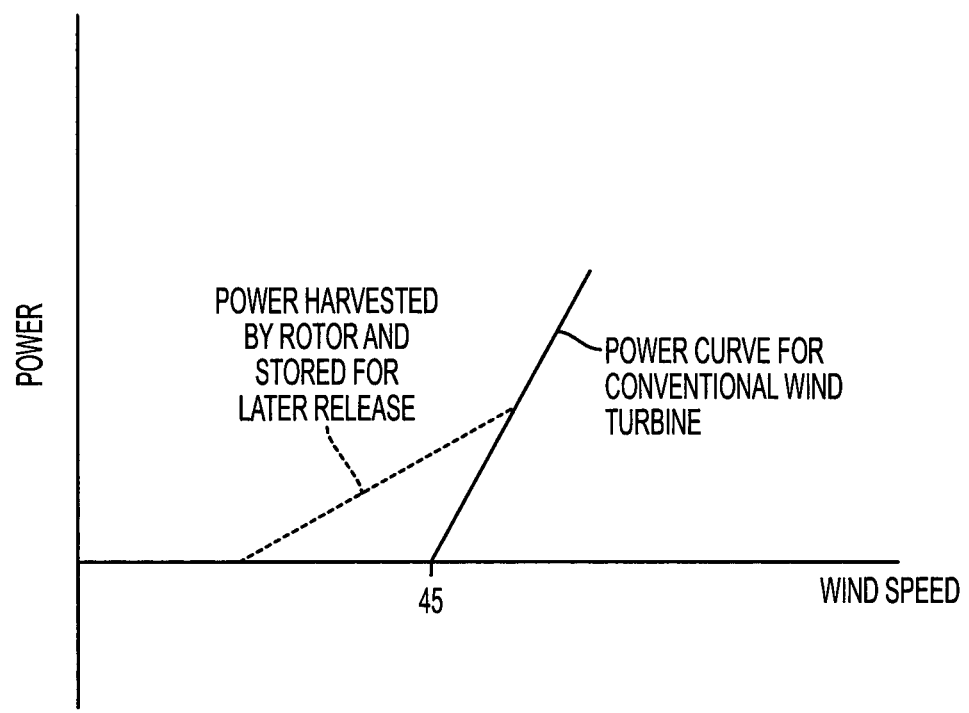
FIG. 8 is a power curve of a wind turbine, showing the cut-in speed of a conventional wind turbine, wind energy harvested by the rotor and hydraulic pump of a wind turbine having a hydraulic transmission for storage in an accumulator and later release to power a hydraulic motor and generator, according to one embodiment.

According to some embodiments for low wind power production, the flow of hydraulic fluid through the motor is prevented so as to minimize or eliminate power needs associated with rotating or operating the motor/generator. This, in effect, may reduce the wind speed at which the pump/rotor may begin operating, that is, the cut-in speed 45 (as reflected in FIGS. 7 and 8). Additionally or alternatively, the set pressure level for the high pressure circuit may be set at low values and/or the pump displacement may be set to a low value to reduce back torque provided against the rotor shaft at low wind speeds. This may allow the rotor to begin rotating at lower wind speeds, where primarily rotational inertia and friction of the pump/rotor may need to be overcome. The turbine controller may also reduce the set pressure level of the high pressure circuit to reduce back torque applied by the pump against the rotor. One embodiment for low wind power production is represented in FIG. 8, which shows the power curve for a conventional wind turbine having a mechanical gear train and an identically configured rotor, and a dashed line representing winds levels at which power may be harvested by rotation of the pump/motor for storage and later release to the motor/generator.

The accumulator of FIG. 6, or the high pressure accumulator of other embodiments described herein, may have a variable pre-charge level. This may be accomplished by having mechanisms that can vary the pressurized pre-charge level for gas-type accumulators or change the pre-tensioning level for spring loaded type accumulators, as may be determined by the turbine controller. Accumulators with variable operating pressure levels may allow system operation to be optimized for different current or expected operating conditions, including seasonal or even longer term trends in wind conditions.

Although FIG. 6 shows a single accumulator present in the high pressure circuit, it is to be appreciated that the term "accumulator", as used herein with reference to the high pressure circuit, refers to one or more accumulators that provide additional capacitance to the high pressure circuit. Multiple accumulators may operate in parallel to one another in the high pressure circuit, and may have any variety and combinations of storage capacities or pre-charge levels. According to some embodiments, the accumulators may include a valve that allows controls opening and closing of fluid communication to the high pressure circuits. This may allow different accumulator(s) to be placed in fluid communication with the high pressure circuit to provide different energy storage capacities, different effective pre-charge levels to the high pressure circuit, and/or to allow some or all of the accumulators to store energy for release at a later time when the corresponding valve is opened.

The embodiment of FIG. 6 includes features that may accompany the addition of the accumulator to the high pressure circuit (equivalently referred to herein as a high pressure accumulator), including a reservoir circuit 46, a reservoir tank 47, a charge pump 48, and a bypass circuit 49. It is to be appreciated, however, that some or all of these features may also be used in embodiments that lack a high pressure accumulator, such as the embodiment of FIG. 1, and that the high pressure accumulator may be used with embodiments that lack some or all of the reservoir circuit, reservoir tank, and the charge pump.

The bypass circuit provides selective transfer of pressurized hydraulic fluid from the high pressure circuit, typically to the low pressure circuit although other embodiments are also possible. The bypass, as illustrated, includes a valve 51 that may be actuated when pressure levels exceed a threshold value. The threshold value may be set to open to prevent pressure levels in the high pressure circuit from reaching levels that may cause damage to equipment in the system, excess wear in the system, danger to persons near the drivetrain, and the like. According to some embodiments, the bypass valve may be electronically controlled, such as by the turbine controller, to open at pressure values that vary according to different criteria, including the set pressure level in the high pressure circuit, among other factors. The bypass valve may be a hydraulic, pilot operated valve, although other types of valves are also possible, including spring loaded check valves, solenoid controlled valves, and the like.

The total volume of hydraulic fluid within the pump, motor, and high and low pressure circuits, including the high pressure accumulator, changes as power is stored in or released from the accumulator. The charge pump 48 of FIG. 6 may be used to provide makeup hydraulic fluid to the low pressure circuit, the hydraulic pump, and then the high pressure circuit as volume of hydraulic fluid in the accumulator increases to store energy. Providing makeup hydraulic fluid may help maintain pressure in the low pressure circuit 31 to keep the hydraulic pump primed and to prevent cavitation at the entrance to the hydraulic pump, entrance to the motor, or elsewhere in the hydraulic conveyance system. As power is released from the accumulator, more hydraulic fluid may flow through the hydraulic motor to the low pressure circuit than is taken up from the low pressure circuit by the hydraulic pump. The low pressure circuit of FIG. 6 includes a low pressure valve 52 that may be actuated to allow the additional hydraulic fluid provided to the low pressure circuit from the motor to be released to the reservoir circuit to prevent excess pressure increase in the low pressure circuit. In this respect, the low pressure valve and charge pump may act together to regulate the pressure level of the low pressure circuit. It is to be appreciated that different types of valves may be used for the low pressure valve, including but not limited to check valves, solenoid actuated valves, and pilot actuated valves. The set point of the low pressure valve may be variably controlled or constant. Operation of the low pressure valve may, according to some embodiments, be electronically controlled.

The reservoir circuit may also include a reservoir tank to provide a supply of hydraulic fluid to the charge pump and to receive hydraulic fluid that is passed from the low pressure circuit through the low pressure valve. The reservoir tank may additionally provide a convenient point for supplying hydraulic fluid to or removing hydraulic fluid from the conveyance system. Other processing may, additionally or alternatively, be possible to perform on hydraulic fluid from the reservoir tank, such as filtering, cooling, and heating. A heat exchanger may remove heat from the hydraulic fluid for the purpose of cooling components in the drivetrain, or to heat the hydraulic fluid prior to wind turbine operation in cold environments.

FIG. 6 additionally illustrates motor and pump leakage flow paths 53, 54 incorporated into the reservoir circuit. As may be appreciated, some degree of hydraulic fluid leakage may be unavoidable from motors and pumps, particularly at high pressures and temperatures. To collect this fluid, leakage flow paths may return leaked oil to the reservoir tank for continued circulation in the hydraulic conveyance system.

Figure 9:
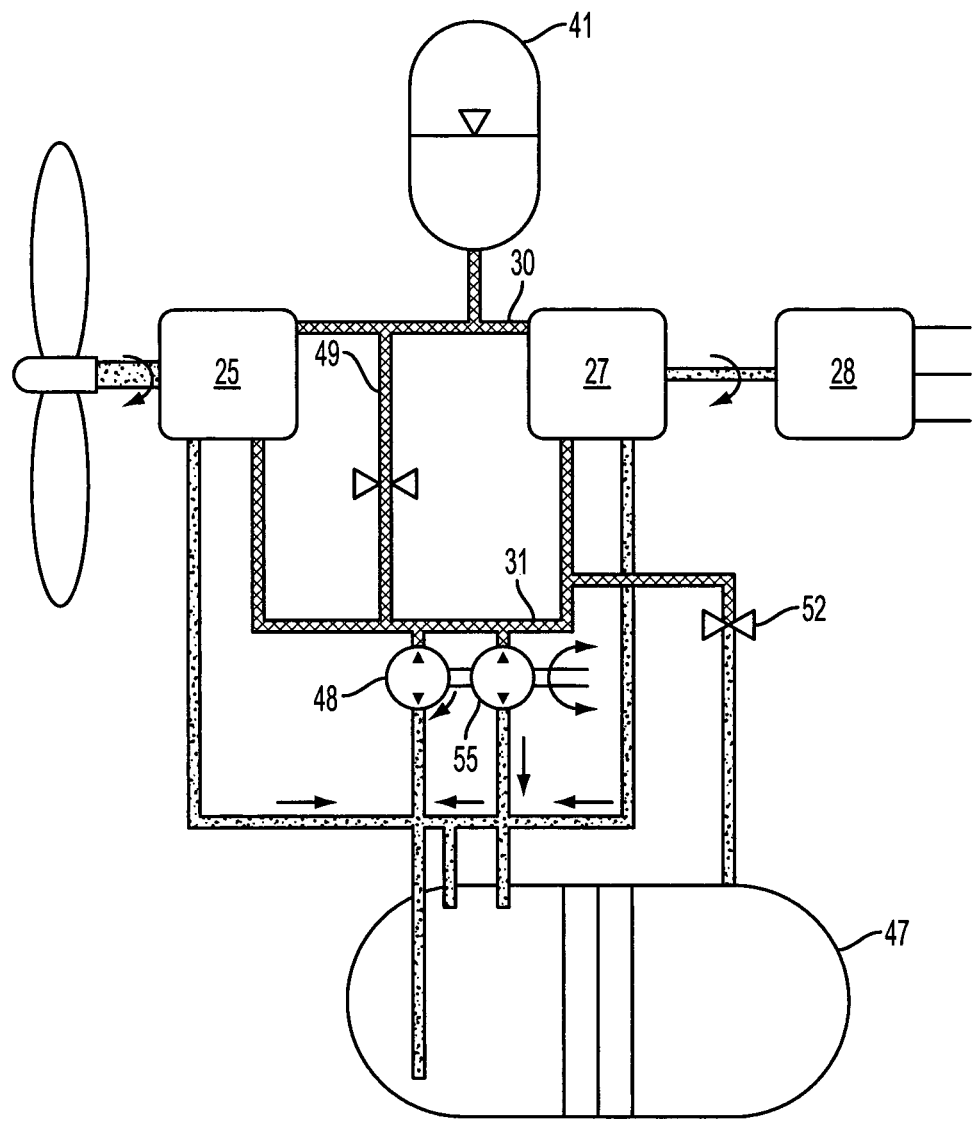
FIG. 9 is a schematic representation of a hydraulic transmission, like that of FIG. 6, with the addition of a low pressure circuit fed pump that provides power to a charge pump of the system, according to one embodiment.

Features may be incorporated into the hydraulic conveyance system to further promote efficient operation of the hydraulic drivetrain. One such feature, shown in FIG. 9, includes a charge motor 55 that is driven by the flow of hydraulic fluid from the low pressure circuit, when available, to provide power to the charge pump that provides a pressurized flow of hydraulic fluid to the low pressure circuit. The charge pump may typically be sized larger than the charge motor, and an external power supply may be used to provide a primary source of power to the pump. However, the charge motor may help power the charge pump and recover power that might otherwise be lost. As pressure in the low pressure circuit increases to above a desired pressure level, typically around 10 bar, fluid may flow through the charge motor, which is powered to, in turn, help drive the charge pump. This may improve efficiency by capturing energy that might otherwise be lost as the low pressure valve is opened to dump excess fluid into the reservoir circuit from the low pressure circuit. The low pressure valve may additionally be used in the embodiment of FIG. 9 to release pressure from the low pressure circuit in the event that the full flow of fluid is too great for the motor and/or in the event of a motor malfunction.

The charge pump, the low pressure valve, and the charge motor may also be used to control the recirculation of fluid throughout the conveyance system. It may be desirable to prevent any portion of the fluid from circulating only through the high pressure and low pressure circuits for too long to prevent overheating of the fluid and to allow for fine level filtering that may occur in the reservoir circuit. The charge motor may be operated at greater levels to provide increased circulation between the reservoir circuit and the high and low pressure circuits. This increased operation may be controlled by powering the motor from an external source or by increasing the motor displacement of the charge motor, when a variable displacement motor is used. In such an embodiment, operation of the charge pump may be used to control the pressure level of the low pressure circuit, as needed, while the operation of the charge motor is used to control the temperature of the low pressure circuit.

Figure 10:
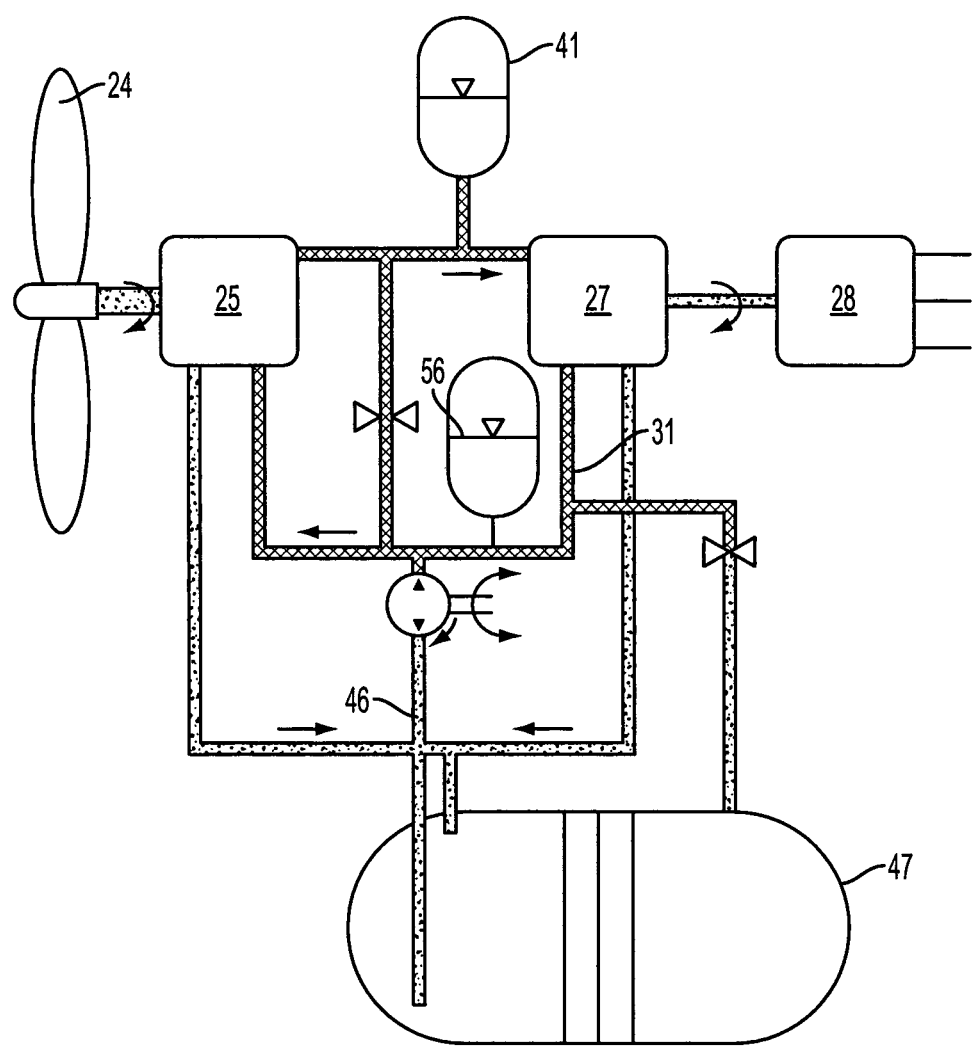
FIG. 10 is a schematic representation of a hydraulic transmission incorporated into a wind turbine and that includes a low pressure accumulator in the low pressure circuit, according to one embodiment.

The embodiment of FIG. 10 includes an accumulator 56 in the low pressure circuit (equivalently, a low pressure accumulator) that may improve the operating efficiency and/or overall cost of the hydraulic transmission system. The low pressure accumulator may be charged when the high pressure accumulator releases hydraulic fluid to the high pressure circuit as the hydraulic motor consumes more fluid that his passed through the hydraulic pump. Conversely, the low pressure accumulator may discharge hydraulic fluid as the high pressure accumulator is charged when the pump is providing more hydraulic fluid to the high pressure circuit than is consumed by the hydraulic motor. In this sense, the low pressure may augment operation of the charge pump. Without the low pressure accumulator, the charge pump may be sized to provide hydraulic fluid at the same flow rate as that of the pump at full power and at a pressure associated with the low pressure circuit. Including the low pressure accumulator in the low pressure circuit allows the charge pump to be sized smaller or even eliminated altogether, thereby reducing overall system cost and/or improving operating efficiency of the system.

The use of multiple accumulators is described herein with respect to the high pressure accumulator and the high pressure circuit. It is to be appreciated, however, that multiple accumulators may also be used on the low pressure circuit, and that the description has been made with reference to the high pressure circuit merely for the sake of convenience.

Figure 11:
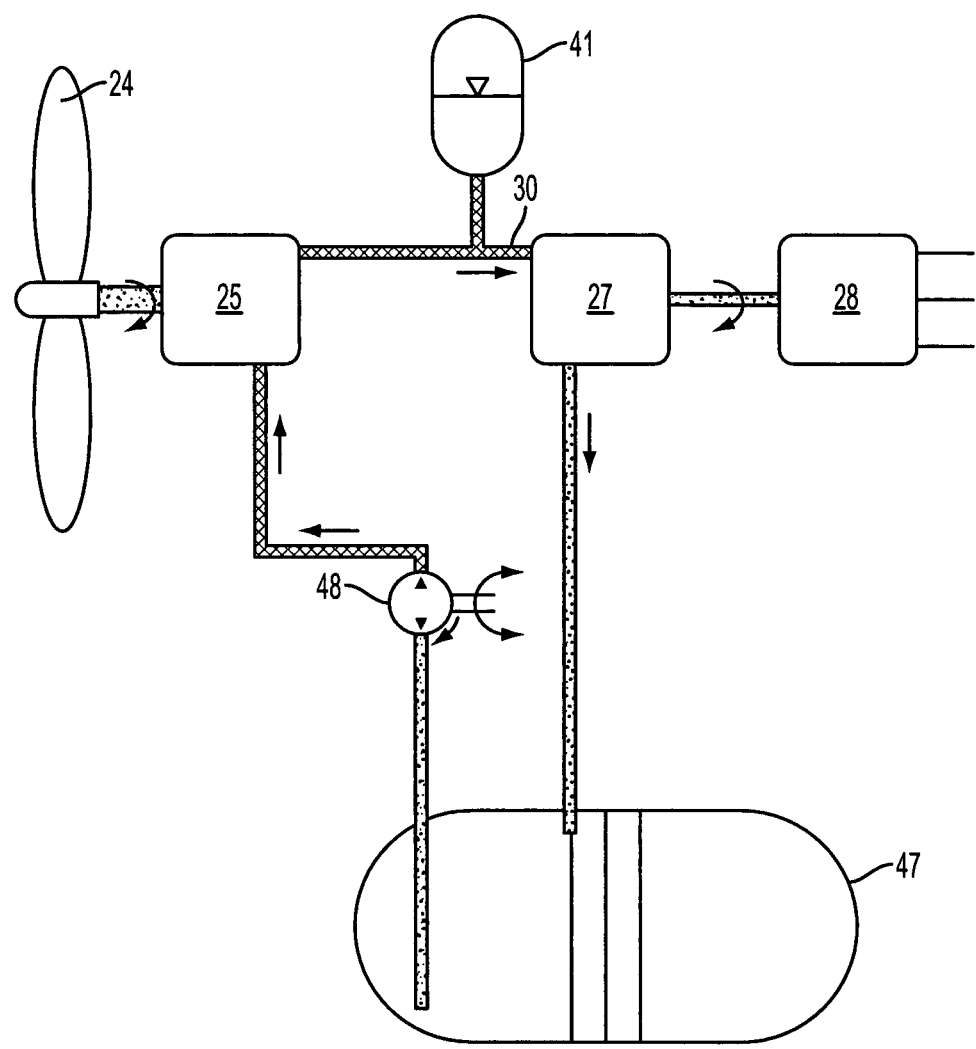
FIG. 11 is a schematic representation of a hydraulic transmission that lacks a low pressure circuit, according to one embodiment.

Each of the embodiments of FIGS. 1, 6, 9, and 10 is shown having a high pressure circuit and a low pressure circuit that allow the hydraulic motor and pump to operate as a hydrostatic transmission. It is to be appreciated, however, that the features described herein, including those associated with the high pressure circuit and the reservoir circuit may alternatively be used with embodiments that lack a low pressure circuit, as shown in FIG. 11, according to one embodiment. This open-loop hydraulic system includes a charge pump that provides a pressurized flow of fluid to the hydraulic pump from the reservoir tank. Hydraulic fluid that passes from the hydraulic motor is returned directly to the reservoir tank, rather than being circulated through a low pressure circuit to the hydraulic pump. Other embodiments may have a form similar to that of FIG. 11, but lack a charge pump altogether. Such embodiments may utilize hydraulic pumps capable of drawing hydraulic fluid under little or no pressure, without concern for cavitation damage. Other embodiments may have the reservoir positioned at a height above the pump inlet so that the hydraulic pump receives a flow of fluid that is pressurized, in part or whole, hydrostatically by virtue of the height of hydraulic fluid.

The pressure of the reservoir in any of the embodiments of FIGS. 1, 6, 9, and 10, or others may be open to the atmosphere and unregulated, according to some embodiments. Alternatively, the pressure in the reservoir tank and/or circuit may be controlled to a pressure level, such as 1 or 2 bars.

The use of a hydraulic pump and hydraulic motor may enable the drivetrain to slow or stop the rotor in a hydraulic braking mode of operation. Braking or slowing may be initiated by increasing the pump displacement to maximize the torque applied against rotation of the rotor by the pump. This may be accompanied by decreasing motor displacement to reduce the draw of hydraulic fluid from the high pressure circuit. Decreasing motor displacement may help increase the rate at which pressure builds in the high pressure circuit to additionally help provide greater torque against the rotor. For embodiments that include a high pressure accumulator, any valve that prevents the flow of hydraulic fluid to the accumulator may be actuated to further increase the rate at which back torque may be applied against the rotor. Additionally or alternatively, the pressure set point of any relief valves that control the transfer of hydraulic fluid from the high pressure circuit may be modulated to either increase or decrease the rate at which pressure builds in the high pressure circuit or to alter the maximum pressure that may be reached in the high pressure circuit. Any combinations of these actions may be initiated at different times or rates to provide a controlled slowing of the rotor to prevent impacts within the system or even a very rapid braking, as may be desired under emergency situations. Such braking modes may be used in combination with a mechanical, dynamic brake as found in many conventional wind turbines, or may be used in place of a dynamic brake.

According to some embodiments, the hydraulic motor, pump and/or other components may be constructed to have a safe state that will prevent operation of the wind turbine or secure a safe shut down, as may be beneficial when a malfunction is detected in the wind turbine or under emergency situations. For the hydraulic pump, this state may include the maximum pump displacement while for the hydraulic motor this may include the minimum pump displacement. The pump and motor may be constructed so that they move into these safe states under predefined circumstances, such as reduced electrical power, no electrical power, a sensor failure, or other potential failure mode. In this respect, the pump and motor having safe states may provide a safety stop or emergency stop for the wind turbine that initiates automatically under a loss or reduction in electrical power available to operate the turbine.

Embodiments may include features that preserve the ability to operate with a hydraulic braking mode by applying back torque against the rotor, even where there is a physical rupture in the high pressure circuit. According to some embodiments, the high pressure circuit may include multiple conduits or passageways that run in parallel from the pump to the motor for providing pressurized hydraulic flow therebetween. Various connections may be made between the pump, separated sections of the pump (such as, different sets of cylinders within the pump), or each of multiple pumps driven by the rotor shaft such that at least some back torque may be applied against the rotor shaft by at least a portion of the pump(s) should other portions of the pump(s) lose the ability to create back pressure due to a rupture.

Another manner in which more efficient and/or lower cost operation of the wind turbine may be obtained is by using the output of the hydraulic pump to provide auxiliary power. As may be appreciated, many wind turbines include an uninterruptible power supply (UPS) that is charged to store power in the event that power is not otherwise available to the wind turbine, such as may occur in a power grid outage. In such a scenario, a charged accumulator that is either dedicated to storing energy for auxiliary use or that is connected to the high pressure circuit may drive an auxiliary hydraulic motor that, in turn, may power an auxiliary generator for providing auxiliary electrical power to the wind turbine. Additionally, an auxiliary accumulator may be used to store power for use, effectively acting as a UPS, when power might not otherwise be available. Implementing a hydraulic accumulator, motor, and generator to provide auxiliary power may, according to some embodiments, allows cost reductions associated with elimination of an electrical UPS and/or an auxiliary transformer for taking power from the primary generator.

Power may, additionally or alternatively, be stored in an accumulator for the purpose of starting the wind turbine. According to some embodiments, the high pressure accumulator may be sized to provide power adequate to initiate operation of the wind turbine, even when the rotor is not being driven by the wind and the power grid is out. Such embodiments may thus be utilized to perform a "black start", which is the initiation of the grid after a grid collapse. It is also to be appreciated that wind turbines may include a separate accumulator specifically to store power to start the wind turbine, according to some embodiments.

Figure 12:
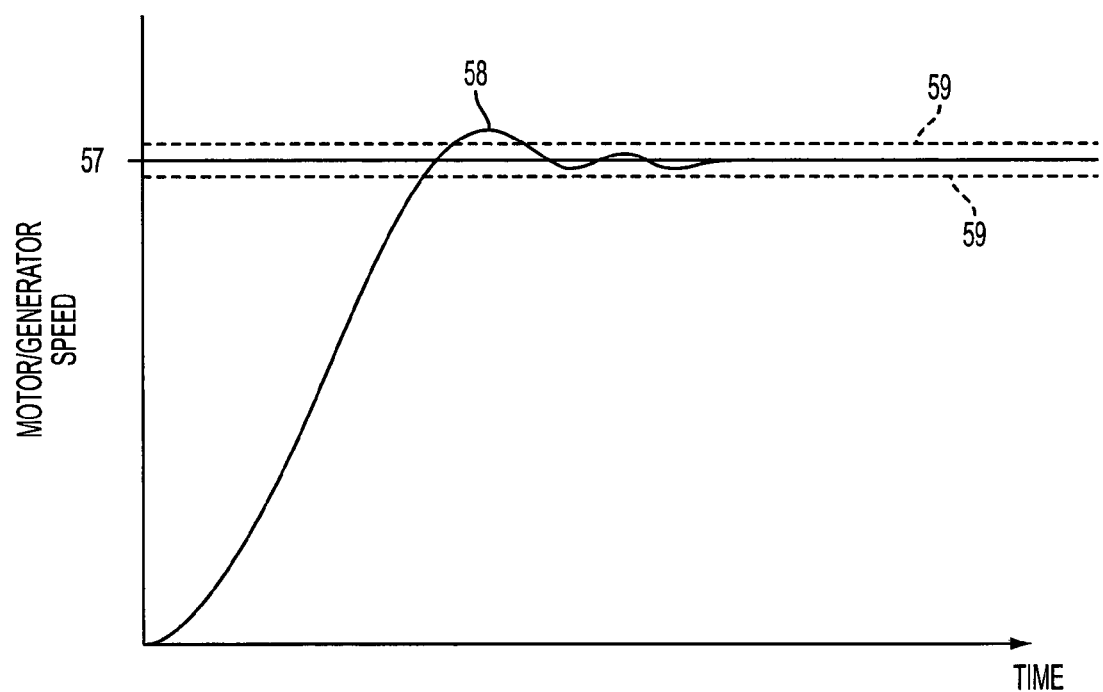
FIG. 12 is a curve showing synchronization of a variable displacement hydraulic motor driven synchronous generator to an electric grid.

Embodiment of the hydraulic transmission described herein may allow a wind turbine to use a synchronous generator, thereby reducing the cost of energy by obviating any need for a converter to engage the generator to an electric grid. FIG. 12 illustrated one manner in which a variable displacement hydraulic motor coupled to a generator, as discussed herein with respect to various embodiments, may be controlled to synchronize the generator to the electric grid. When the wind turbine is started, the generator will typically be brought up to speed under no load or minimal load until the rotor of the generator is spinning a speed near the synchronization speed 57 associated with the electrical grid. As represented in FIG. 12, a target speed for the generator may lie in some range or band of speeds 59 near the synchronization speed, rather than at the specific synchronization speed. Once at or near the synchronization speed, the displacement of the variable displacement hydraulic motor may be altered to change the speed of the generator until a matched or near matched phase relationship between the rotor and stator of the generator exists. Once matched or near matched, the generator may be synchronized to the grid in a manner that prevents abrupt increases in torque.

Bringing the motor and generator toward the synchronization speed involves greater absolute changes in the speed of the generator and motor than matching the phase relationships between the rotor and stator of the generator. To improve control during each of these different portions of the synchronization process, each portion may be associated with different gains for altering displacement of the hydraulic motor.

Variable displacement hydraulic motors may have finitely adjustable net displacements, particularly where displacement is adjusted by altering a number of cylinders that are actuated in a motor from cycle-to-cycle of the motor, even if each of the cylinders is associated with multiple actuation states. To provide for greater control during the synchronization process in light of this finite nature, the generator may be controlled to a speed greater than the synchronization speed such that the generator overshoots 58 or crosses the synchronization speed. The generator may then be controlled in a manner that minimizes the impact of finite, step-wise control as the generated is controlled toward the synchronization speed and/or into a matched phase relationship while the generator speed is experiencing an overall reduction. It should be appreciated, however, that synchronization does not require such an overshoot, and may be accomplished while the speed of the generator is increasing.

Various embodiments of the hydraulic transmissions systems are shown and described herein as having a single pump and a single motor/generator. It is contemplated, however, that additional embodiments may include more than one pump driven by the rotor shaft and/or more than one motor/generator driven by hydraulic power from the pump(s). Various benefits may be realized by having more than one pump or motor/generator. According to some embodiments, the wind turbine may continue to operate at reduced maximum power levels where one of multiple pumps or motors/generators is shut down for a potential malfunction, allowing the continued production of at least some power by the wind turbine. Providing more than one motor/generator may allow a reduction in the overall volume and/or weight of the motor/generator system. Economies of scale may also be realized by an increased number of motors and generators to be manufactured.

Each of the components of the drivetrain described herein, including the pump, motor, generator, high pressure accumulators, low pressure accumulators, reservoir tank, and other components may be located at various positions in a wind turbine. According to some embodiments, at least the motor and generator may be located in the tower, or near a lower portion of the tower. This may help reduce the weight of the nacelle or upper portion of the tower, providing the overall wind turbine with a natural frequency that may better avoid resonance. According to some embodiments, the reservoir tank may be positioned within the tower such that the hydraulic fluid therein may act to dampen motion of the wind turbine.

For purposes herein, "hydraulic pump" refers generally to any device or combination of devices, which convert mechanical power in the form of a moving mass, either rotationally or linearly, into hydraulic power. Additionally, the "hydraulic motor" refers generally to any device or combination of devices which convert hydraulic power into mechanical power. Some non-limiting examples of pumps and motors, and particularly variable displacement pumps and motors, include swash plate pumps and motors, gear pumps and motors, screw pumps and motors, radial piston pumps and motors, vane pumps and motors, and gerotors.

The above-described embodiments of various methods that may be used to control the wind turbine or portions thereof can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. That is, one single controller or multiple controllers may be used to execute the control schemes described herein with respect to the blade angle controller, the pump control, the motor/generator controller and/or the turbine controller. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of any one of the embodiments described herein comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments described herein wherein processes are implemented in a computer readable medium, the computer implemented processes may, during the course of their execution, receive input manually (e.g., from a user).

The phraseology and terminology used herein is for the purpose of description and should not be regarded as limiting. The use of "including", "comprising", "having", "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of this description invention. Accordingly, the foregoing description is by way of example only, and is not intended as limiting. The invention(s) are limited only as defined by the following claims and the equivalents thereto.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. For example, although aspects of the invention are described above with reference to a horizontal axis wind turbine, aspects of the invention may be used with any type of wind turbine, including vertical axis widn turbines, darius wind turbines, savonious wind turbines, and the like. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling a wind turbine that includes a rotor, one or more blades mounted to the rotor, a variable displacement hydraulic pump mechanically connected to the rotor, a variable displacement hydraulic motor, and a high pressure circuit that connects the hydraulic pump to the hydraulic motor, the method comprising:
   harvesting power from wind to rotate the rotor;
   driving the hydraulic pump with the rotor to provide a pressurized flow of hydraulic fluid to the high pressure circuit;
   driving the hydraulic motor with the pressurized flow of hydraulic fluid from the high pressure circuit;
   in a first mode of operation, controlling displacement of the hydraulic motor to control power produced from the motor at a substantially constant power; and
   in a second mode of operation different than the first mode of operation, controlling a speed of the rotor by altering displacement of the hydraulic pump, and controlling pressure of the high pressure circuit by altering displacement of the hydraulic motor to produce power from the hydraulic motor that varies with respect to the variable displacement of the hydraulic motor;
   wherein the wind turbine is operated in the second mode of operation when a wind level is below a level capable of sustaining operation of the hydraulic motor at a constant value associated with a rated power level of the wind turbine;
   wherein the wind turbine is operated in the first mode of operation when the wind level is above the level.

2. The method claim 1, wherein the high pressure circuit provides fluid communication between the hydraulic pump and the hydraulic motor without an accumulator.

3. The method of claim 1, wherein in the second mode of operation, controlling pressure of the high pressure circuit includes altering displacement of the hydraulic motor to produce power from the hydraulic fluid received from the hydraulic pump without diversion to an accumulator.

4. The method of claim 1, further comprising:
   storing energy provided to the high pressure circuit in a high pressure accumulator.

5. The method of claim 4, further comprising:
   releasing energy stored in the accumulator by lowering a set pressure level to which the high pressure circuit is controlled.

6. The method of claim 1, wherein controlling a pressure of the high pressure circuit includes controlling pressure to a set point that is determined, at least in part, based on wind speed.

7. The method of claim 1, wherein the variable displacement of the hydraulic motor in the second mode of operation varies with respect an amount of power harvested from the wind to rotate the rotor.

8. The method of claim 1, wherein the rotor speed is controlled to a rotor speed set point that is determined, at least in part, based on wind speed.

9. The method of claim 1, wherein the first mode of operation further includes controlling pressure of the high pressure circuit by altering displacement of the hydraulic pump.

10. The method of claim 1, wherein in the first mode of operation, speed of the rotor is controlled by altering a pitch angle of the one or more blades.

11. A computer readable storage medium comprising program code instructions which, when executed by a controller of a wind turbine, cause the wind turbine to:
   harvest power from wind to rotate a rotor of the wind turbine;
   drive a variable displacement hydraulic pump with the rotor to provide a pressurized flow of hydraulic fluid to a high pressure circuit;
   drive a variable displacement hydraulic motor with the pressurized flow of hydraulic fluid from the high pressure circuit;
   in a first mode of operation, control displacement of the hydraulic motor to control power produced from the motor at a substantially constant power; and
   in a second mode of operation different than the first mode of operation, control a speed of the rotor by altering displacement of the hydraulic pump, and control pressure of the high pressure circuit by altering displacement of the hydraulic motor to produce power from the hydraulic motor that varies with respect to the variable displacement of the hydraulic motor;
   wherein the wind turbine is operated in the second mode of operation when a wind level is below a level capable of sustaining operation of the hydraulic motor at a constant value associated with a rated power level of the wind turbine;
   wherein the wind turbine is operated in the first mode of operation when the wind level is above the level.

12. A wind turbine comprising:
   a rotor comprising one or more blades;
   a variable displacement hydraulic pump mechanically connected to the rotor;
   a variable displacement hydraulic motor;
   a high pressure circuit that connects the hydraulic pump to the hydraulic motor; and
   one or more controllers configured to:
      drive the hydraulic pump with the rotor to provide a pressurized flow of hydraulic fluid to a high pressure circuit;
      drive the hydraulic motor with the pressurized flow of hydraulic fluid from the high pressure circuit;
      in a first mode of operation, control displacement of the hydraulic motor to control power produced from the motor at a substantially constant power; and
      in a second mode of operation different than the first mode of operation, control a speed of the rotor by altering displacement of the hydraulic pump, and control pressure of the high pressure circuit by altering displacement of the hydraulic motor to produce power from the hydraulic motor that varies with respect to the variable displacement of the hydraulic motor;
      wherein the wind turbine is operated in the second mode of operation when a wind level is below a level capable of sustaining operation of the hydraulic motor at a constant value associated with a rated power level of the wind turbine;
      wherein the wind turbine is operated in the first mode of operation when the wind level is above the level.

13. The computer readable storage medium of claim 11, wherein the high pressure circuit provides fluid communication between the hydraulic pump and the hydraulic motor without an accumulator.

14. The computer readable storage medium of claim 11, further comprising program code instructions configured to store energy provided to the high pressure circuit in a high pressure accumulator.

15. The computer readable storage medium of claim 11, wherein in the first mode of operation, pressure of the high pressure circuit is controlled by altering displacement of the hydraulic pump.

16. The computer readable storage medium of claim 11, wherein in the first mode of operation, speed of the rotor is controlled by altering a pitch angle of one or more blades.

17. The wind turbine of claim 12, wherein the high pressure circuit provides fluid communication between the hydraulic pump and the hydraulic motor without an accumulator.

18. The wind turbine of claim 12, further comprising a high pressure accumulator configured to store energy provided to the high pressure circuit.

19. The wind turbine of claim 12, wherein in the first mode of operation, pressure of the high pressure circuit is controlled by altering displacement of the hydraulic pump.

20. The wind turbine of claim 12, wherein in the first mode of operation, speed of the rotor is controlled by altering a pitch angle of the one or more blades.

* * * * *